US011933080B2

(12) United States Patent
Ludmann et al.

(10) Patent No.: US 11,933,080 B2
(45) Date of Patent: Mar. 19, 2024

(54) CLOSING SYSTEM FOR A DOOR OR HATCH OF A MOTOR VEHICLE, DOOR OR HATCH OF A MOTOR VEHICLE, MOTOR VEHICLE

(71) Applicant: Volkswagen Aktiengesellschaft, Wolfsburg (DE)

(72) Inventors: Larissa Ludmann, Cremlingen (DE); Arne Behrens, Calvoerde/OT Wegenstedt (DE); Joerg Lederer, Braunschweig (DE); Swantje Schick, Braunschweig (DE); Oliver Mix, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 395 days.

(21) Appl. No.: 17/296,297

(22) PCT Filed: Nov. 21, 2019

(86) PCT No.: PCT/EP2019/082077

§ 371 (c)(1),
(2) Date: May 24, 2021

(87) PCT Pub. No.: WO2020/104586

PCT Pub. Date: May 28, 2020

(65) Prior Publication Data

US 2022/0010597 A1 Jan. 13, 2022

(30) Foreign Application Priority Data

Nov. 23, 2018 (DE) ........................ 102018220205.2

(51) Int. Cl.
*E05B 79/04* (2014.01)
*E05B 9/08* (2006.01)
(Continued)

(52) U.S. Cl.
CPC .............. *E05B 79/04* (2013.01); *E05B 9/084* (2013.01); *E05B 77/44* (2013.01); *E05B 85/06* (2013.01)

(58) Field of Classification Search
CPC .......... E05B 9/084; E05B 77/44; E05B 79/02; E05B 79/04; E05B 85/06
See application file for complete search history.

(56) References Cited

U.S. PATENT DOCUMENTS 6,401,302 B1 * 6/2002 Josserand ............... E05B 79/06 292/336.3
6,523,871 B1 * 2/2003 Josserand ............... E05B 79/06 292/DIG. 41

(Continued)

FOREIGN PATENT DOCUMENTS

CN 104018742 A 9/2014
CN 105723039 A 6/2016

(Continued)

*Primary Examiner* — Christopher J Boswell
(74) *Attorney, Agent, or Firm* — Laurence A. Greenberg; Werner H. Stemer; Ralph E. Locher

(57) ABSTRACT

A closing system for a door or hatch of a motor vehicle includes: a bearing piece and a cylinder lock situated on the bearing piece, the cylinder lock having a cylinder bushing and a cylinder core; and a locking clamp which is held on the bearing piece, engages the cylinder bushing from behind and has a holding lug which is oriented parallel to the cylinder bushing, a fastening screw passing through the holding lug, and the tip of the screw lying in a receiving depression in the cylinder bushing in order to preload the locking clamp against the cylinder bushing. A protective element rests on an outer side of the bearing piece and has at least one retaining lug which is oriented parallel to the cylinder bushing, and the fastening screw also passes through the retaining lug.

13 Claims, 3 Drawing Sheets

(51) Int. Cl.
*E05B 77/44* (2014.01)
*E05B 85/06* (2014.01)

(56) References Cited

U.S. PATENT DOCUMENTS

| | | | | |
|---|---|---|---|---|
| 6,834,901 | B2 * | 12/2004 | Low | E05B 79/06<br>292/336.3 |
| 8,746,758 | B2 * | 6/2014 | Savant | E05B 85/16<br>292/336.3 |
| 8,959,964 | B2 * | 2/2015 | Hidaka | E05B 79/06<br>292/DIG. 31 |
| 9,228,380 | B2 * | 1/2016 | Gerber | E05B 79/06 |
| 10,107,016 | B2 * | 10/2018 | Dikici | E05B 79/04 |
| 2005/0034495 | A1 | 2/2005 | Lennhoff | |
| 2009/0223264 | A1 | 9/2009 | Lennhoff et al. | |
| 2010/0000272 | A1 * | 1/2010 | Muller | E05B 9/084<br>70/102 |
| 2016/0251878 | A1 | 9/2016 | Dikici et al. | |
| 2017/0002589 | A1 * | 1/2017 | Toyama | E05B 85/06 |
| 2018/0187458 | A1 * | 7/2018 | Beck | E05B 85/06 |
| 2022/0298836 | A1 * | 9/2022 | Nielsen | E05B 85/06 |
| 2022/0396972 | A1 * | 12/2022 | Kim | E05B 85/06 |

FOREIGN PATENT DOCUMENTS

| | | | |
|---|---|---|---|
| DE | 102004012456 | A1 | 9/2005 |
| DE | 102008019013 | A1 | 10/2009 |
| DE | 102011052960 | A1 | 2/2013 |
| DE | 102012112520 | A1 | 6/2014 |
| EP | 1286010 | A1 | 2/2003 |
| EP | 3085864 | A1 | 10/2016 |

* cited by examiner

CLOSING SYSTEM FOR A DOOR OR HATCH OF A MOTOR VEHICLE, DOOR OR HATCH OF A MOTOR VEHICLE, MOTOR VEHICLE

BACKGROUND OF THE INVENTION

Field of the Invention

The invention relates to a closing system for a door or hatch of a motor vehicle, having a bearing piece and a cylinder lock situated on the bearing piece, wherein the cylinder lock has a cylinder bushing and a cylinder core, and a locking clamp which is held on the bearing piece, engages the cylinder bushing from behind and has a holding lug which is oriented parallel to the cylinder bushing, wherein a fastening screw passes through the holding lug and the tip of the screw lies in a receiving depression in the cylinder bushing in order to preload the locking clamp against the cylinder bushing.

The invention further relates to a door or hatch for a motor vehicle having such a closing system.

The invention further relates to a motor vehicle having such a door or hatch.

Closing systems of the type mentioned in the introduction are known from the prior art. Thus the published patent application DE 10 2012 112 520 A1 discloses a generic closing system. In order to improve the theft protection and/or the protection from the unauthorized opening of the cylinder lock, a locking clamp which is made of sheet steel and which is held on the bearing piece and radially engages the cylinder bushing from behind is provided herein. In order to ensure the engagement from behind permanently, the locking clamp is preloaded by means of a fastening screw against the cylinder bushing. In this case, the fastening screw is inserted into a receiving depression of the cylinder bushing so that the cylinder bushing is anchored and/or locked on the locking clamp. The cylinder bushing is now only able to be removed from the bearing piece by using high force and/or by destroying the locking clamp. It has been shown that a closing system which is configured in this manner leads to a high level of break-in protection or theft protection. A similar closing system is also disclosed in the published patent application DE 10 2004 012 456 A1.

SUMMARY OF THE INVENTION

The object of the invention is to provide an improved closing system which further improves the theft protection.

The object of the invention is achieved by a closing system as claimed. This closing system has the advantage that a removal of the closing cylinder or the cylinder bushing from the bearing piece is virtually impossible without the bearing piece being destroyed as a whole. It is achieved by means of the invention that a release of the screw from the receiving depression, without turning the fastening screw itself, is reliably prevented. According to the invention, it is provided that a protective element rests on an outer side of the bearing piece and has at least one retaining lug which is oriented parallel to the cylinder bushing, and the fastening screw is also guided through the retaining lug and/or passes through the retaining lug. As a result, the screw is held on the bearing piece so as to be guided, on the one hand, by the retaining lug of the protective element and, on the other hand, by the holding lug of the locking clamp, such that in particular the screw is no longer able to be distorted until it is bent out of the receiving depression with the screw tip thereof. As a result, the theft protection is further increased.

According to a preferred development of the invention, the locking clamp and the protective plate are arranged at least substantially parallel to one another on the bearing piece. As a result, forces may be advantageously introduced from the screw into the locking clamp and protective plate when an attempted theft is made.

In particular, the locking clamp is positively held on the bearing piece, axially to the cylinder bushing. As a result, an axial displacement of the locking clamp in the bearing piece is reliably prevented. Thus the screw is fastened by the retaining lug and the holding lug particularly securely in its orientation on the bearing piece and/or on the cylinder bushing.

According to a preferred development of the invention, the bearing piece is produced from plastics, whilst the locking clamp and the protective element are produced from metal. If an attempted theft is made, the metal components protect the plastics of the bearing piece from damage, whereby the theft protection is further increased.

Preferably, the protective element is configured as a protective plate. This protective plate is able to be manufactured in a simple and cost-effective manner and provides the aforementioned advantages. Moreover, the protective plate has the advantage that it takes up less constructional space and thus is advantageously able to be integrated in the closing system.

Particularly preferably, the holding lug has a screw opening with an internal thread, wherein the fastening screw is screwed into the internal thread. As a result, the fastening screw is supported, on the one hand, on the closing cylinder and, on the other hand, on the holding lug. As a result, a simple bracing of the locking clamp against the cylinder bushing is ensured by means of the fastening screw, since the fastening screw supports the holding lug itself on the cylinder bushing.

According to a preferred development of the invention, the screw tip and the receiving depression of the cylinder bushing are configured so as to correspond to one another. As a result, the advantage is achieved that the screw tip and the receiving depression cooperate positively with one another, in particular at least substantially without play, so that a secure seat of the fastening screw in the receiving depression is ensured. Preferably the screw tip and the receiving depression are of conical configuration in order to permit a self-centering of the fastening screw during assembly.

According to a preferred development of the invention, the protective element is of annular configuration and surrounds the cylinder lock. Thus, in principle, the protective element has a shape which is similar to that of the locking clamp. As the protective element surrounds the closing cylinder in an annular manner, it ensures a large bearing surface on the bearing piece for the advantageous introduction of force and also directly protects the bearing piece from damage since it prevents a tool in the region of the closing cylinder from coming directly into contact with the bearing piece.

It is further preferably provided that the protective element is configured as external cladding of the closing system, in particular the door or hatch. The protective element thus, on the one hand, has the advantageous properties described above for theft protection and, on the other hand, forms at the same time an outer plate and thus a visible part of the closing system. The highly integrated configuration provides advantages in terms of constructional space.

According to a preferred development of the invention, the cylinder bushing has a cylinder bushing head which protrudes from the bearing piece and which is larger than an opening of the annular protective element so that the cylinder bushing head is axially supported directly or indirectly on the protective element. As a result, the cylinder bushing and/or the closing cylinder is reliably prevented from being forced into the bearing piece and/or in the direction of the inner face of the door or the hatch. The cylinder bushing is supported in this case with its enlarged cylinder bushing head on the protective element which in turn bears against the bearing piece. Optionally a cladding element, in particular the external cladding element, preferably the external cladding plate, is arranged between the protective element and the cylinder bushing head so that the cylinder bushing head is supported on the cladding element which in turn is supported on the protective element which bears against the bearing piece.

The door or hatch according to the invention is characterized by the closing system according to the invention. The aforementioned advantages are provided thereby.

Particularly preferably, the door or hatch has an outer plate which, in particular, forms the protective element and which has the retaining lug. Thus the retaining lug is advantageously formed by the outer plate of the door or hatch itself. An embodiment of the closing system which saves constructional space is provided thereby.

The motor vehicle according to the invention as claimed is characterized by the door or hatch according to the invention. The aforementioned advantages are provided thereby.

Further advantages and preferred features and combinations of features result from, in particular, that which has been described above and from the claims. The invention is to be described in more detail hereinafter with reference to the drawing, in which:

DETAILED DESCRIPTION OF THE INVENTION

Figure 1A:
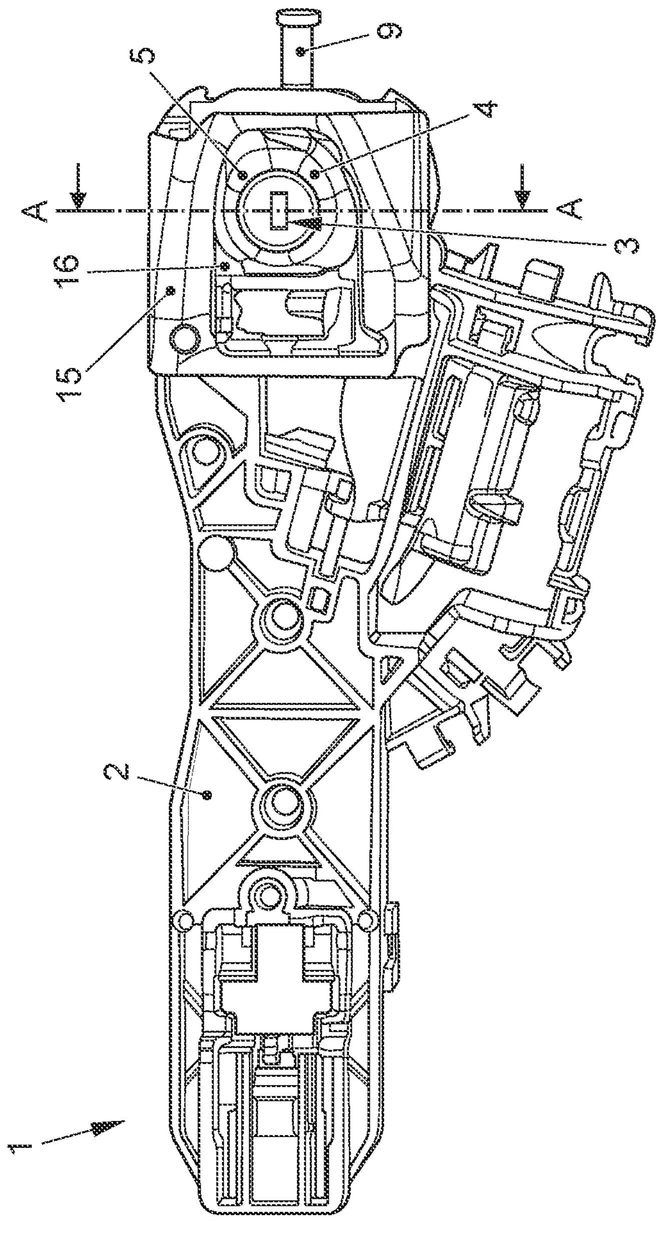
FIGS. 1A and 1B show a bearing piece with an advantageous closing system.
Figure 1B:
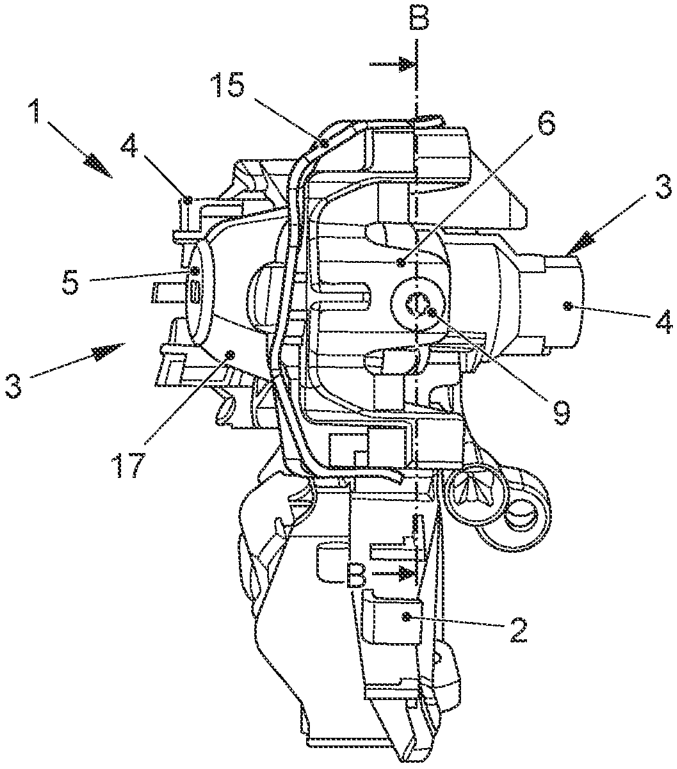

FIGS. 1A and 1B show in different views a closing system 1 for a door or hatch, not shown here, of a motor vehicle. In this case FIG. 1A shows the closing system 1 in a plan view and FIG. 1B shows the closing system 1 in a side view.

The closing system 1 has a bearing piece 2 which is produced from plastics and which may be fastened to the door or hatch. The bearing piece is configured to bear in a movable manner an actuatable door handle of the motor vehicle, a user being able to unlock and open the hatch or door thereby. For reasons of clarity the door handle is not shown.

The bearing piece 2 also bears a cylinder lock 3. This cylinder lock has a cylinder bushing 4 which is fastened to the bearing piece 2 and in which a cylinder core 5 is rotatably mounted. The cylinder core 5 has a receiver for a suitable key so that a rotational movement of the cylinder core 5 is only possible when the associated key is inserted into the key receiver. The cylinder core 5 is connected to a locking mechanism, the hatch or door being able to be blocked thereby on a vehicle frame. For reasons of clarity, the locking mechanism is not shown but is known to the person skilled in the art.

A locking clamp 6, which is located in a plane perpendicular to the longitudinal central axis of the cylinder bushing 4 and which radially engages the cylinder bushing 4 from behind, is present for blocking the cylinder bushing 4 on the bearing piece 2.

Figure 2A:
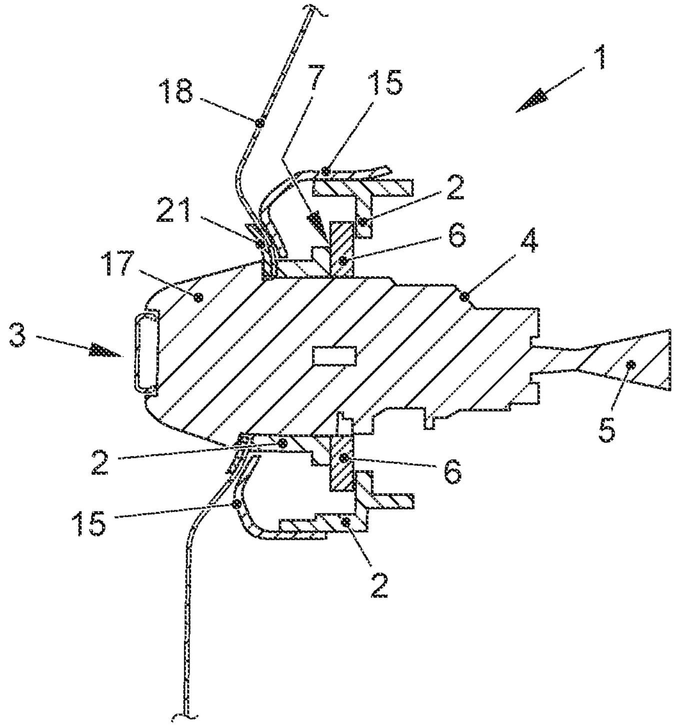
FIG. 2A shows a first longitudinal sectional view through the bearing piece and FIG. 2B shows a second longitudinal sectional view through the bearing piece in a plane rotated by 90° relative to the view shown in FIG. 2A.
Figure 2B:
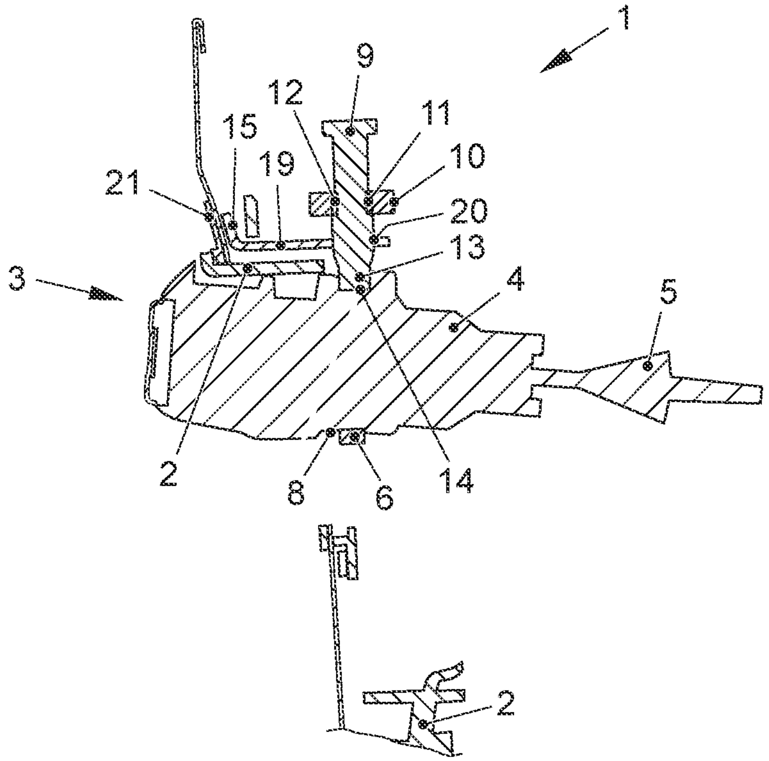

For illustrative purposes, FIGS. 2A and 2B in each case show longitudinal sectional views through the bearing piece 2, level with the central longitudinal axis of the cylinder bushing 4. In this case FIG. 2A shows a longitudinal section through the closing system 1 along the line A-A. FIG. 2B shows a longitudinal sectional view through the closing system 1 along the line B-B of FIG. 1B. The two cutting planes are thus located at an angle of 90° to one another and in each case run through the longitudinal central axis of the cylinder bushing 4.

As visible from FIGS. 2A and 2B, the locking clamp 6 encompasses the cylinder bushing 4 in an annular manner. In this case the locking clamp 6 is positively held in the axial direction by the bearing piece 2, so that said locking clamp is displaceable, in particular only radially, relative to the cylinder bushing 4. To this end the bearing piece 2 has a guide receiver 7, the locking clamp 6 being displaceably mounted thereby radially to the cylinder bushing 4. As FIG. 2B shows, the cylinder bushing 4 has a lateral radial depression 8 into which the locking clamp 6 may be pulled in order to fasten the cylinder bushing 4 axially to the bearing piece 2. In order to ensure the seat of the locking clamp 6 in the depression 8 permanently, the locking clamp 6 is assigned a fastening screw 9.

The locking clamp 6 has a holding lug 10 which, as shown for example in FIGS. 1B and 2B, is oriented at least substantially parallel to the longitudinal central axis of the cylinder bushing 4 and has a screw opening 11 with an internal thread 12. The fastening screw is firstly screwed into the internal thread 12 with a screw tip 13 in the direction of the cylinder bushing 4. As a result, the longitudinal central axis of the fastening screw 9 is oriented at least substantially radially to the cylinder bushing 4. The screw tip 13 is configured to engage radially in a receiving depression 14 of the cylinder bushing 4. To this end, the screw tip 13 and the receiving depression 14 are configured so as to correspond to one another. According to the present exemplary embodiment, the screw tip 13 and the receiving depression 14 have a cylindrical longitudinal section. Optionally the screw tip 13 and the receiving depression 14 have a conical longitudinal section in order to facilitate the threading of the fastening screw 9 into the receiving depression 14 and to permit self-centering.

If the fastening screw 9 is now screwed into the thread 12, so that the screw tip 13 comes to rest in the receiving depression 14, as shown in FIG. 2B, the locking clamp 6 at its end remote from the holding lug 10 is screwed with an increasing insertion depth into the radial depression 8 of the cylinder bushing 4 which is configured on the side opposing and/or remote from the receiving depression 14, whereby the cylinder bushing 4 is fixedly fastened to the bearing piece 2.

The closing system 1 also has a protective element 15. The protective element 15 is configured as a protective plate 16 which bears against an outer face of the bearing piece 2. As visible in FIG. 1A, the protective element 15 is of annular configuration so that it surrounds the cylinder bushing 4 in a manner similar to the locking clamp 6. The protective element 15 is arranged, in particular, parallel to the locking clamp 6. By means of the annular configuration, the protective element 15 has an opening 16 through which the cylinder bushing 5 protrudes. In this case, the clear width of the opening 16 is smaller than the width of a cylinder bushing head 17 of the cylinder bushing 4. The cylinder bushing head 17 of the cylinder bushing 4 protrudes from the bearing piece 2 so that the protective element 15 is located below the cylinder head 17 and is able to be preloaded between the cylinder head 17 and the bearing piece 2.

The protective element 15 is screwed, for example, to the bearing piece 2 in order to secure its position in the bearing piece 2. If this is carried out, the cylinder bushing 4 may no longer be forced inwardly into the door or hatch, since the cylinder bushing head 17 is supported on the protective element 15.

Optionally, an external cladding 18 of the door or hatch, in particular in the form of a cladding plate which extends in the region of the cylinder head 17 and the protective element 15, is also arranged between the protective element 15 and the cylinder head 17.

The protective element 15 is configured so as to bear flat against the bearing piece 2 in order to transmit high forces onto the bearing piece 2. Said protective element prevents the closing system 1 from being able to be broken into by the closing cylinder 3 being forced in.

Moreover, the protective plate 15 has a retaining lug 19 which extends at least substantially parallel to the closing cylinder 3. In this case the retaining lug 19 is configured such that it has an opening 20, the internal diameter thereof being only slightly larger than the external diameter of the fastening screw 9. The retaining lug 19 extends sufficiently far parallel to the closing cylinder 3 that the opening 20 is located level with the fastening screw 9, wherein the retaining lug 19 in this case is preferably located between the fastening lug 10 and the cylinder bushing 4. The fastening screw 9, as visible in particular in FIG. 2B, is guided through the opening 20 so that the screw is radially encompassed and supported by the retaining lug 19.

If in the case of an attempted break-in, a high force is now exerted on the fastening screw 9, for example in order to remove this screw by force from the receiving depression 14, the protective element 15 with the retaining lug 19 prevents the fastening screw 9 from being bent out of the receiving depression 14. As a result, the closing system 1 is reliably prevented from being broken into.

In particular, the protective element 15 and the locking clamp 6 are produced from metal in order to withstand high forces and to protect the bearing piece 2 from damage.

In order to ensure the seal, an annular resiliently deformable sealing element 21 is preferably also held in a preloaded manner between the cylinder bushing head 17 and the external cladding part 18 or protective element 15.

LIST OF REFERENCE NUMERALS

1 Closing system
2 Bearing piece
3 Cylinder lock
4 Cylinder bushing
5 Cylinder core
6 Locking clamp
7 Guide receiver
8 Depression
9 Fastening screw
10 Holding lug
11 Screw opening
12 Internal thread
13 Screw tip
14 Receiving depression
15 Protective element
16 Opening
17 Cylinder bushing head
18 External cladding
19 Retaining lug
20 Opening
21 Sealing element

The invention claimed is:

1. A closing system for a door or hatch of a motor vehicle, the closing system comprising:

a bearing piece;

a cylinder lock disposed on said bearing piece, said cylinder lock having a cylinder bushing and a cylinder core;

a locking clamp held on said bearing piece and engaging said cylinder bushing from behind, said locking clamp having a holding lug oriented parallel to said cylinder bushing;

a protective element resting on an outer side of said bearing piece and having at least one retaining lug which is oriented parallel to said cylinder bushing; and a fastening screw passing through said holding lug and through said at least one retaining lug, said fastening screw having a tip lying in a receiving depression formed in said cylinder bushing for preloading said locking clamp against said cylinder bushing.

2. The closing system according to claim 1, wherein said locking clamp and said protective element are arranged at least substantially parallel to one another.

3. The closing system according to claim 1, wherein the locking clamp is positively held on the bearing piece, axially to the cylinder bushing.

4. The closing system according to claim 1, wherein said bearing piece is produced from plastics and said locking clamp and said protective element are produced from metal.

5. The closing system according to claim 1, wherein said protective element is a protective plate.

6. The closing system according to claim 1, wherein said holding lug is formed with a screw opening having an internal thread, and wherein said fastening screw is screwed into said internal thread.

7. The closing system according to claim 1, wherein said screw tip and said receiving depression are configured so as to correspond to one another.

8. The closing system according to claim 1, wherein said protective element has an annular configuration and surrounds said cylinder lock.

9. The closing system according to claim 1, wherein said protective element is an external cladding of the closing system.

10. The closing system according to claim 1, wherein said cylinder bushing has a cylinder bushing head which protrudes from said bearing piece and which is configured to be larger than an opening of said closing element so that said cylinder bushing head is axially supported on said protective element.

11. A door or hatch for a vehicle, comprising a closing system according to claim 1.

12. The door or hatch according to claim 11, further comprising an external cladding forming the protective element and having the retaining lug.

13. A motor vehicle, comprising at least one door or hatch with a closing system according to claim 1.

* * * * *